Jan. 12, 1932. J. H. FEDELER Re. 18,328

METHOD FOR CLEANING AND CHARGING AIR FILTER MEDIUMS

Original Filed Oct. 17, 1925

INVENTOR
John H. Fedeler
BY C. P. Zoepel
ATTORNEY

Reissued Jan. 12, 1932

Re. 18,328

UNITED STATES PATENT OFFICE

JOHN H. FEDELER, OF NEW YORK, N. Y., ASSIGNOR, BY MESNE ASSIGNMENTS, TO AMERICAN AIR FILTER COMPANY, INC., OF LOUISVILLE, KENTUCKY, A CORPORATION OF DELAWARE

METHOD FOR CLEANING AND CHARGING AIR FILTER MEDIUMS

Original No. 1,577,703, dated March 23, 1926, Serial No. 63,201, filed October 17, 1925. Application for reissue filed December 24, 1927. Serial No. 242,466.

This invention relates to a method for cleaning and charging air filter mediums, and has for its primary object and purpose to effect the thorough cleaning and charging of the filtering material contained in one or more trays, cells or holders of a filter installation without removing the same from their operative positions, thus resulting in a considerable saving in time and obviating the great amount of labor heretofore entailed in the removal of the filter mediums and their proper cleaning and recharging.

It is one of the important objects of the invention to provide a method of cleaning and charging such air filter mediums in situ wherein the filter medium is thoroughly permeated by a viscous solution discharged under pressure so that the surfaces of the different particles of filtering material will be completely coated with a film of such solution. In one embodiment of this new method, I may first discharge streams of hot water alternately against the opposite sides of the filter medium to remove all adhering particles of dust and dirt, and then subsequently subject the opposite sides of the filtering medium alternately to the action of a viscous solution discharged thereon under pressure.

It is also an object of my invention to provide a new method in which use is made of an inclined air deflecting wall or plate which directs the air stream through the filtering medium during the operation of the filter for the purpose of partly cleaning the air before its passage through the filter.

With the above and other objects in view, my improved method and one embodiment of the apparatus whereby such method may be carried out will be hereinafter described in detail, and the several novel features thereof subsequently incorporated in the subjoined claims.

Figure 1:
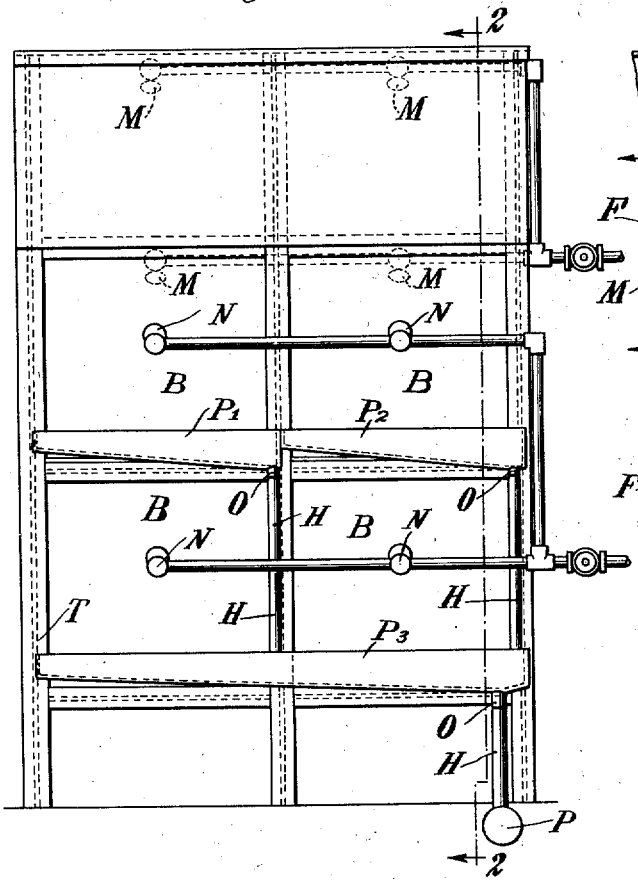
Figure 2:
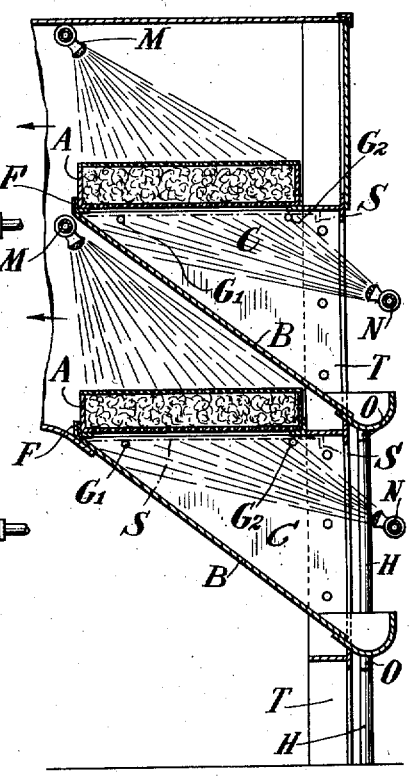
Figure 3:
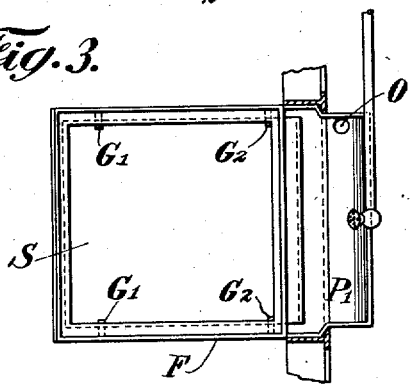

In the drawings, in which similar reference characters designate corresponding parts throughout the several views, Figure 1 is a front elevation of an air filter installation provided with a filter medium cleaning and charging means operating in accordance with my improved method;

Fig. 2 is a vertical sectional view thereof taken on the line 2—2 of Fig. 1, and Fig. 3 is a top view showing one of the filter cell supports attached to the frame structure.

My improved method of cleaning and charging is readily adaptable to various types of filters, and more particularly to such air filters wherein there is provided a series of vertically spaced filter medium containing cells supported in a suitable frame work usually built in the intake of a blower or the like which draws or forces the air through the filter mediums.

In order to enable the present improvements to be most effectively applied to air filters of the above type, I provide a special form of support for each of the filter cells. Thus, each filter medium or cell generally indicated at A as herein shown consists of a metallic box, casing, or enclosure of suitable proportions having upper and lower walls of foraminous or reticulated construction, the interior of this box, cell, or casing being completely and compactly filled with a suitable metallic filtering material.

The filter medium as above described is arranged upon a supporting frame F which surrounds the upper open side of an enclosure C preferably formed from a sheet metal stamping open at one end and having its opposite side walls at said open end thereof riveted or otherwise permanently secured to spaced vertical parts of the frame work T. The bottom wall B of this sheet metal enclosure is obliquely inclined downwardly from the opposite end of the frame F to said open end of the enclosure. This inclined wall serves to deflect the air entering the open end of said enclosure and direct the same upwardly through the filtering medium. To the lower ends of the inclined directing walls B, the collecting pans indicated at $P^1$, $P^2$ and $P^3$ are secured. As shown, the separate pans $P^1$ and $P^2$ are provided for the two upper horizontally aligned filter mediums A while a common pan $P^3$ is provided for the two lower filtering mediums. It will of course, be understood that the illustrated arrangement of the filtering mediums may be multiplied as desired in accordance with the volume of air to be filtered. In the illustrated embodiment of the apparatus, each pan has a drain outlet O towards which the bottom of the pan slopes and with each of these outlets O, a pipe or rubber hose indicated at H is connected, said hose at its lower open end discharging either into the next lower collecting pan or into a sewerage system indicated at P. When however, the collected solution is to be again used, the drain pipe or hose may be arranged to discharge into a tank or other suitable receptacle from which the liquid can be withdrawn.

Where it is necessary to use a solvent in the solution to dissolve adherent solid particles retained by the filter medium, I may provide for each of the filter mediums a removable metal plate or slide S which is adapted to be supported by the rods or pins indicated at $G^1$, $G^2$ on the side walls of the sheet metal enclosure immediately below each end of the filter medium. Thus, when this plate S is in position, the solvent solution may be retained in contact with the filter medium for any desired length of time, and then subsequently permitted to drain therefrom by withdrawing the slide plate S.

Under normal operating conditions, in accordance with my improved method, I first alternately discharge hot water under pressure upon the upper and lower sides of the filter mediums, and thereafter in similar manner discharge a viscous solution upon said filter mediums. For this purpose I provide suitable spray nozzles indicated at M and N positioned respectively above and below the filter mediums and connected with suitable pipes or conduits to which the required cleaning and charging agents are adapted to be supplied. These spray nozzles are so arranged that the liquid cleaning and charging agents are discharged therefrom under the requisite pressure substantially uniformly over the entire area of the filtering mediums so that the latter will be thoroughly permeated thereby.

I have found in practice that the filter mediums can be most effectively charged by atomizing the viscous solution while the filter is in operation. It will of course also be apparent that the upper surface of the inclined wall B will become coated with this viscous solution. This is advantageous since a large part of the impurities in the air will be caught on this coated surface, thus lengthening the time periods between the cleaning of the filtering mediums. The surplus liquid drains from the filter mediums upon the inclined walls B and is thereby directed by gravity into the several collecting pans $P^1$, $P^2$ and $P^3$ and finally into the depository P. Should it, however, be desirable to reclaim and again use the washing liquid or viscous solution, the outlet O of any one or more of the collection pans may be closed by a suitable plug, and after the liquid has collected therein, the drain pipe or hose H is held over a bucket or other receptacle and the plug then removed so that the collected liquid can be re-used. In many cases, instead of cleaning the filter mediums with hot water, a solution may be employed for this purpose which also has the necessary adhesive qualities to provide an adherent film on the surfaces of the filtering medium. In such case, the drain pipe H from the lowermost pan may discharge into a collection tank provided with suitable filter means for removing the collected solids. This solution may thus be repeatedly used and supplied by a suitable pump under pressure from the tank to the discharge nozzles M and N.

From the foregoing description considered in connection with the accompanying drawings, the several novel features of my improved method of cleaning and charging filter mediums and of the means for carrying out such method will be clearly and fully understood. While I have herein referred to a typical air filter installation in connection with which my invention has been satisfactorily employed, it will nevertheless be understood that this is largely suggestive and that the advantageous features of the invention might also be adapted and applied for use in connection with various other types of such air filters. Accordingly, it is to be understood that in the further development of the invention, I reserve the privilege of resorting to all such legitimate changes in the structural parts of the apparatus illustrated in the drawings, and to the various other adaptations of my improved method in connection with different types of air filters, as may be fairly considered within the spirit and scope of the appended claims.

I claim:

1. The method of cleaning and charging air filter mediums which consists in alternately subjecting opposite sides of the filter medium to a spray of water and then to a spray of viscous material.

2. The method of recharging the filter medium of an air filter which consists in first subjecting the same to the action of a cleansing agent, and then applying a viscous material thereto without removing the filter medium.

3. A method of maintaining an air filter having spaced vertically superposed filter mediums at maximum operating efficiency, which consists in periodically charging each filter medium with a viscous solution, and recoating the surface of an air deflecting member associated with each of the filtering mediums with the surplus viscous solution draining from the filter medium for the purpose of adhesively trapping foreign matters in the air stream prior to its passage through the filter medium.

In testimony that I claim the foregoing as my invention, I have signed my name hereto.

JOHN H. FEDELER.